United States Patent
Orihara et al.

(10) Patent No.: US 10,860,669 B2
(45) Date of Patent: Dec. 8, 2020

(54) USER ESTIMATION APPARATUS, USER ESTIMATION METHOD, AND USER ESTIMATION PROGRAM

(71) Applicant: NIPPON TELEGRAPH AND TELEPHONE CORPORATION, Chiyoda-ku (JP)

(72) Inventors: Shingo Orihara, Musashino (JP); Yoshihito Oshima, Musashino (JP); Hiroshi Asakura, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 95 days.

(21) Appl. No.: 15/578,799

(22) PCT Filed: Jun. 2, 2016

(86) PCT No.: PCT/JP2016/066344
§ 371 (c)(1),
(2) Date: Dec. 1, 2017

(87) PCT Pub. No.: WO2016/194996
PCT Pub. Date: Dec. 8, 2016

(65) Prior Publication Data
US 2018/0165369 A1    Jun. 14, 2018

(30) Foreign Application Priority Data
Jun. 5, 2015 (JP) .................................. 2015-114983

(51) Int. Cl.
*G06F 16/9535* (2019.01)
*H04L 29/08* (2006.01)

(52) U.S. Cl.
CPC ........ *G06F 16/9535* (2019.01); *H04L 67/025* (2013.01); *H04L 67/22* (2013.01); *H04L 67/306* (2013.01)

(58) Field of Classification Search
None
See application file for complete search history.

(56) References Cited

U.S. PATENT DOCUMENTS 8,566,866 B1 * 10/2013 Fleischman ...... H04N 21/23424
707/769
2009/0070443 A1 * 3/2009 Vanderhook ........... G06Q 30/02
709/222

(Continued)

FOREIGN PATENT DOCUMENTS

| JP | 2006-127321 A | 5/2006 |
| JP | 2014-106661 A | 6/2014 |
| JP | 2014-115952 A | 6/2014 |

OTHER PUBLICATIONS

International Search Report dated Aug. 9, 2016 in PCT/JP2016/066344 Filed Jun. 2, 2016.

*Primary Examiner* — Philip C Lee
(74) *Attorney, Agent, or Firm* — Oblon, McClelland, Maier & Neustadt, L.L.P.

(57) ABSTRACT

A user estimator includes an extractor extracting at least either order of page transitions on a website by a user or a time interval of transition to each page, as a feature amount of page browsing by the user, from data to be learned and representing a request by the user to the website, and extracting at least either order of page transitions on the website or a time interval of transition to each page, as a feature amount of page browsing by any user, from data to be estimated and representing requests by the users to the website, a learning unit creating a model indicating a feature of page browsing for each user, by learning the extracted (Continued)

feature amount, to be learned, of page browsing by each user, and an estimation unit referring to the feature amount, to be estimated, and the model, and estimating the user among users.

6 Claims, 7 Drawing Sheets

(56) References Cited

U.S. PATENT DOCUMENTS

| | | | |
|---|---|---|---|
| 2011/0078556 A1* | 3/2011 | Prasad | G06F 9/451 715/234 |
| 2011/0145715 A1* | 6/2011 | Malloy | H04L 43/026 715/738 |
| 2011/0191664 A1* | 8/2011 | Sheleheda | G06F 15/173 715/205 |
| 2013/0031060 A1* | 1/2013 | Lowery | H04L 67/1095 707/689 |
| 2014/0317726 A1* | 10/2014 | Turgeman | G06F 21/32 726/19 |

\* cited by examiner

FIG.2

```
03:02:01 11/March/2015    GET /index.html     Cookie:userID=user&sessionID=ABC
03:02:20 11/March/2015    GET /data.html      Cookie:userID=user&sessionID=ABC
03:03:22 11/March/2015    GET /login.cgi      Cookie:userID=admin&sessionID=XYZ
03:03:34 11/March/2015    GET /tmp/foo.html   Cookie:userID=user&sessionID=ABC
03:04:10 11/March/2015    GET /index.html     Cookie:userID=admin&sessionID=XYZ
03:05:12 11/March/2015    GET /sample.html    Cookie:userID=admin&sessionID=XYZ
                          ...
```

FIG.3

| ITEM NUMBER | USER NAME | REQUEST 1 | REQUEST 2 | REQUEST 3 | ... |
|---|---|---|---|---|---|
| 1 | user | PATH: /index.html<br>TIME: 03:02:01 | PATH: /data.html<br>TIME: 03:02:20 | PATH: /tmp/foo.html<br>TIME: 03:03:34 | ... |
| 2 | admin | PATH: /login.cgi<br>TIME: 03:03:22 | PATH: /index.html<br>TIME: 03:04:10 | PATH: /sample.html<br>TIME: 03:05:12 | ... |
| ... | ... | ... | ... | ... | ... |

FIG.4

| NUMBER | URL PATH |
|---|---|
| #1 | /index.html |
| #2 | /data.html |
| #3 | /tmp/foo.html |
| #4 | /login.cgi |
| #5 | /sample.html |
| ⋮ | ⋮ |

FIG.5

(WHEN TIME INTERVAL OF EACH REQUEST IS USED AS IT IS){USER: user, FEATURE AMOUNT: #1#2:3, #2#3:4, #3#1:3, #1#2:5, ...}
(WHEN AVERAGE VALUE IS USED){USER: user, FEATURE AMOUNT: #1#2:4, #2#3:4, #3#1:3, ...}

/news/domestic/sports/soccer/index.html → /news/domestic/sports/
/news/domestic/sports/baseball/index.html → /news/domestic/sports/
/news/domestic/index.html → /news/domestic/index.html

FIG.9

/foo/bar/abc001 → /foo/bar/abc%NUM
/foo/bar/abc002 → /foo/bar/abc%NUM
/foo/bar/abc10101 → /foo/bar/abc%NUM

FIG.10

USER ESTIMATION APPARATUS, USER ESTIMATION METHOD, AND USER ESTIMATION PROGRAM

FIELD

The present invention relates to a user estimation apparatus, a user estimation method, and a user estimation program.

BACKGROUND

Conventionally, there are techniques for clustering and learning users, predicting the users' browsing behavior patterns, and presenting users having a similar browsing behavior pattern, by using, as a feature amount, a combination of transition information consisting of functions of pages browsed by the users (for example, search, product list, and purchase) on the basis of the browsed pages (refer to Patent Literature 1). By applying such a technique, it is possible to presume who the user is among users who visited in the past from site browsing behavior pattern of the user.

CITATION LIST

Patent Literature

Patent Literature 1: JP 2014-106661 A

SUMMARY

Technical Problem

However, with the above techniques, if the number of pages browsed by a user is small or the number of links included in the browsed pages is small, it is difficult to make a difference in information on transitions of the browsed pages for each user. As a result, in reality, even if users who browsed the pages are different users, they are presented as similar users in some cases. That is, according to the prior art, there is a problem that if the number of pages browsed by a user is small or the number of links included in the browsed page is small, if an attempt is made to estimate who the user is among users who visited in the past from browsing behavior pattern of the user, estimation accuracy is low.

It is therefore an object of the present invention to solve the above problem and accurately estimate who the user is among users who visited in the past even if the number of pages browsed by the user or the number of links included in the page is small.

Solution to Problem

To solve the above-described problems, the present invention is a user estimation apparatus, comprising: an extraction unit that extracts at least either order of page transitions on a website by a user or a time interval of a transition to each page, as a feature amount of page browsing by the user, from data which is to be learned and represents a request by the user to the website, and the extraction unit extracts at least either order of page transitions on the website or a time interval of a transition to each page, as a feature amount of page browsing by any user, from data which is to be estimated and represents requests by the users to the website; a learning unit that creates a model indicating a feature of page browsing for each user, by learning the feature amount, which is to be learned and is extracted by the extraction unit, of page browsing by each user; and an estimation unit that refers to the feature amount, which is to be estimated and is extracted by the extraction unit, of page browsing by the user, and the model, and estimates who the user is among users.

Advantageous Effects of Invention

According to the present invention, even if the number of pages browsed by a user or the number of links included in the page is small, it is possible to accurately estimate who the user is among users who visited in the past.

DESCRIPTION OF EMBODIMENTS

Hereinafter, modes (embodiments) for carrying out the present invention will be described separately in the first embodiment through the fourth embodiment with reference to the drawings.

First, the outline of a user estimation apparatus 10 according to each embodiment will be described. The user estimation apparatus 10 according to each embodiment extracts a feature amount of page browsing on a website by each user (for example, order of page transitions and time required for a transition to each page), from data representing a request to the website (for example, access log), and creates a profile (model) indicating a feature of page browsing by each user. Then, when receiving data to be estimated (data representing a request by any user to the website), the user estimation apparatus 10 refers to the feature amount of the behavior of the user indicated in the data and the above model, and estimates who the user is among users.

First Embodiment

Figure 1:
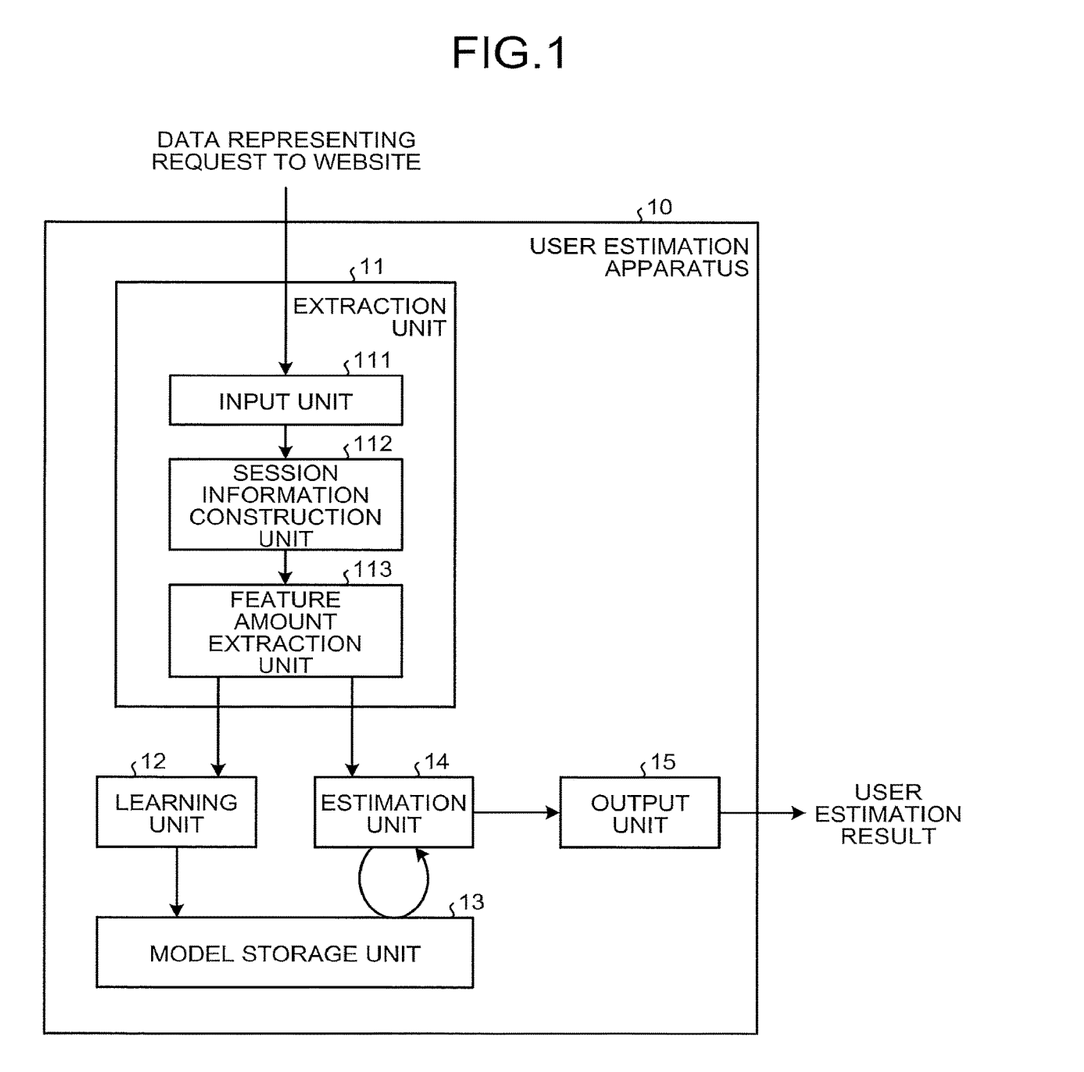
FIG. 1 is a functional block diagram of a user estimation apparatus.

As illustrated in FIG. 1, the user estimation apparatus 10 according to the first embodiment includes an extraction unit 11, a learning unit 12, a model storage unit 13, an estimation unit 14, and an output unit 15.

When receiving data representing a request by a user to a website, the extraction unit 11 extracts a feature amount of page browsing by the user on the basis of a uniform resource locator (URL) of a request destination indicated in the data. Specifically, the extraction unit 11 extracts order of page transitions on the website by the user and time required for a transition to each page as the feature amounts of page browsing by the user. Note that the extraction unit 11 extracts both feature amounts, that is, a feature amount of page browsing by the user for model creation and a feature amount of page browsing by the user for user estimation. When receiving data for model creation, the extraction unit 11 outputs the extracted feature amount to the learning unit 12, and when receiving data to be estimated for user, the extraction unit 11 outputs the extracted feature amount to the estimation unit 14. Note that as for the switching of the output destination in the extraction unit 11, a flag indicating whether the data is data for model creation (data to be learned) or data to be estimated for user is added to input data, and on the basis of the flag, the switching of the output destination in the extraction unit 11 may be determined. Alternatively, the user estimation apparatus 10 is provided with two states of a learning mode and an estimation mode, and the modes are switched manually or automatically by time zone or the like. Data input in the learning mode may be determined to be data for model creation, and data input in the estimation mode may be determined to be data to be estimated.

Furthermore, the way of giving the input data to the extraction unit 11 may be either batch processing of collectively passing data of a plurality of rows at a time or real-time processing of passing data line by line and performing processing each time. In the following, the batch processing will be described as an example, but it is also possible to process in the real-time processing.

The extraction unit 11 includes an input unit 111, a session information construction unit 112, and a feature amount extraction unit 113.

Figure 2:
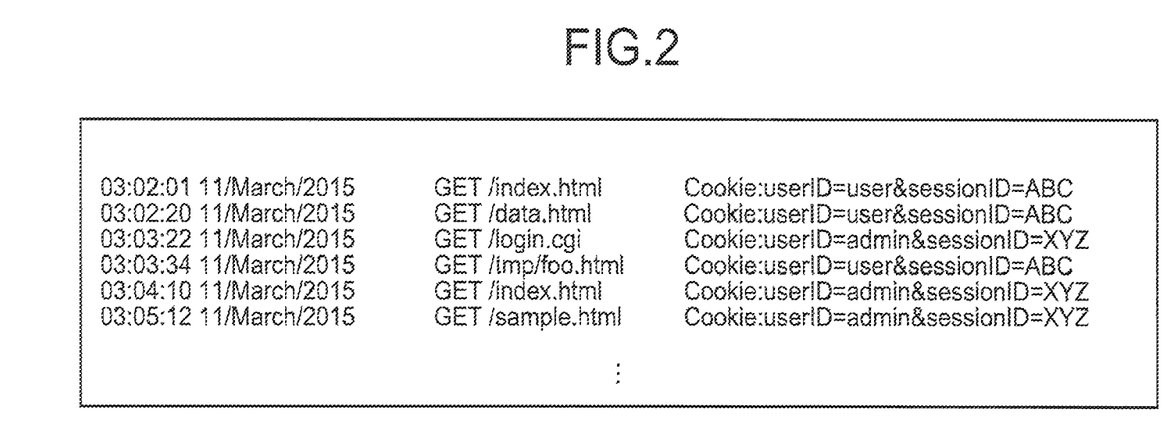
FIG. 2 is a diagram illustrating an example of data received by an input unit.

The input unit 111 receives the data representing a request by the user to the website. This data representing the request includes, for example, those capturing packets of communication contents between a user's terminal device (not illustrated) and a server (server providing the above-mentioned website) and access logs of the server (refer to FIG. 2). The format of this data representing the request does not matter as long as the data includes information such as time, a URL path of a request destination, a session identification (ID), or an originating internet protocol (IP) address, which are necessary for constructing the session information of the user described later.

The session information construction unit 112 picks up the request constituting the session from the data obtained by the input unit 111 and constructs the session information. Determination criteria of picking out will be described later. Herein, the session information is information in which a user name (user ID) accessing in the session, a URL path of the request destination included and time in the session are arranged in chronological order for each session of the website (refer to FIG. 3). Note that a method of hypertext transfer protocol (HTTP) (GET, POST, and the like) may be included in the URL path included in the session information, or the entire URL (http://domain/path/) may be included therein.

Note that a session is a sequence of requests made by the same user from logging in to the logout of the user (user's terminal) on the website. What is obtained by adding a request made by the same user before or after logging in to the website to the above session may be taken as a session. Furthermore, even when the user does not log in, for example, a series of requests whose time intervals from an immediately preceding request is equal to or less than a threshold value and that comes from the same originating IP address may be taken as a session.

Figure 3:
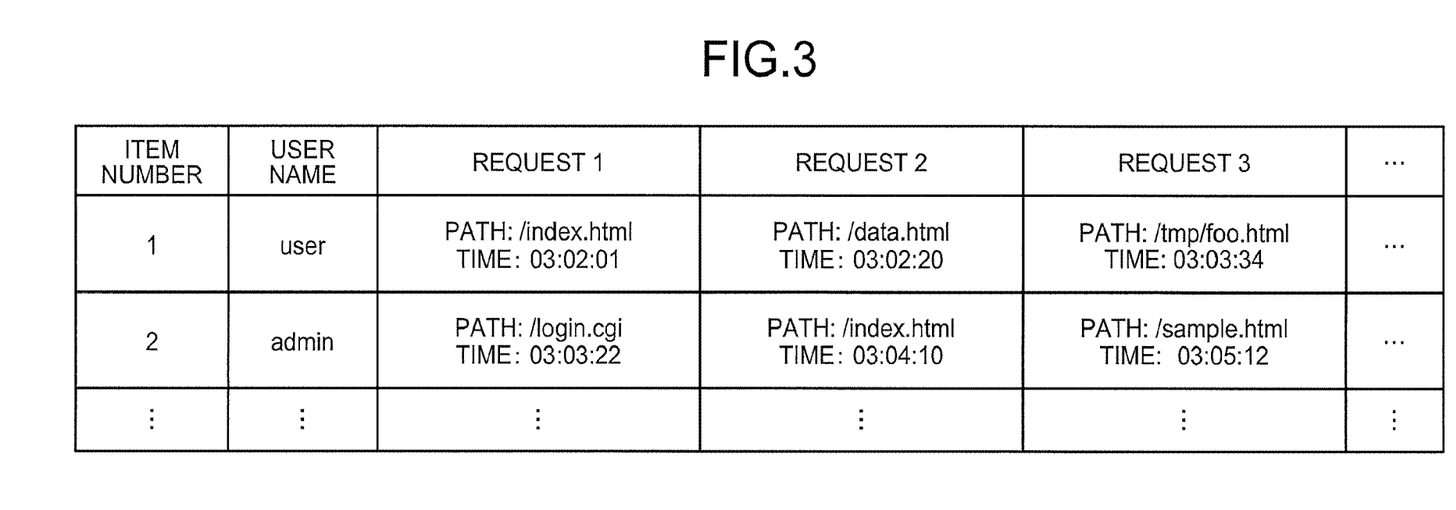
FIG. 3 is a diagram illustrating an example of session information constructed by a session information construction unit.

The session information exemplified in FIG. 3 represents one piece of session information as one row of a table. A method of representing this session information is not limited to the above table, but may be javascript (registered trademark) object notation (JSON) and the like.

Furthermore, as a criterion for picking out a request constituting a session, a criterion for picking out a request with the same session ID included in a cookie used in a web application can be considered. Furthermore, the criterion may be a criterion that picks out a request whose time interval from an immediately preceding request is the predetermined threshold value or below among requests from the same originating IP address. Furthermore, as a method of specifying a user name included in the session information, in addition to a method of obtaining a user name from a parameter entered by the user on a login page as used in general web application, an originating IP address may be used instead of the user name if the environment is one where the originating IP address can be associated with the user.

The feature amount extraction unit 113 extracts order of page transitions on the website (order of page transitions) and time required for a transition to each page (page transition time interval), as feature amounts of page browsing by the user, from the individual session information (refer to FIG. 3).

Figure 4:
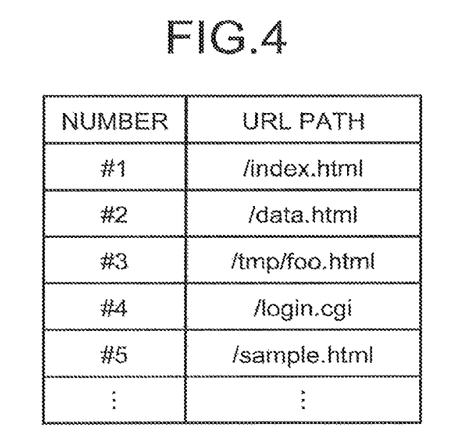
FIG. 4 is a diagram illustrating an example of a conversion table used by a feature amount extraction unit.

For example, the feature amount extraction unit 113 extracts the order of page transitions as follows. First, the feature amount extraction unit 113 makes a URL path of the request destination included in the session information (refer to FIG. 3) correspond to a number one-to-one with a conversion table (refer to FIG. 4). Note that this conversion table (refer to FIG. 4) may be prepared in advance, or if the URL path of the request destination to be processed is not in the conversion table (refer to FIG. 4), the conversion table may be a conversion table that is updated in each case, for example, in such a way that a new number is assigned and added.

Thereafter, the feature amount extraction unit 113 replaces a sequence including the URL path of the request destination included in the session information (refer to FIG. 3) with a character string of numbers. For example, the feature amount extraction unit 113 obtains "#1#2#3 . . . " as a character string corresponding to the session information of item number 1 illustrated in FIG. 3. Furthermore, the feature amount extraction unit 113 obtains "#4#1#5 . . . " as a character string corresponding to the session information of item number 2 illustrated in FIG. 3. Note that the feature amount extraction unit 113 may directly extract the character strings obtained as described above as the order of page transitions as they are, or may extract n sets (n is two or more) of a pair of adjacent requests as the order of page transitions, for example, extract a pair of adjacent requests in the session information (for example, "#1#2, #2#3, . . . " from "#1#2#3 . . . "). That is, the feature amount extraction unit 113 may extract the order of page transitions by applying a feature amount extraction method called n-gram in character string processing.

Furthermore, for example, the feature amount extraction unit 113 extracts the page transition time interval from the time of each request in the session information (refer to FIG. 3). For example, when the feature amount extraction unit 113 refers to the session information (refer to FIG. 3), and finds that the time interval between requests #1 and #2 is three seconds, the feature amount extraction unit 113 obtains a feature amount "#1#2:3". For the page transition time interval herein, the time interval of each request indicated in the order of page transitions may be used as it is. For example, when a plurality of transitions to the same page exists in the same session, an average value of time intervals of these transitions to the page may be used.

Figure 5:
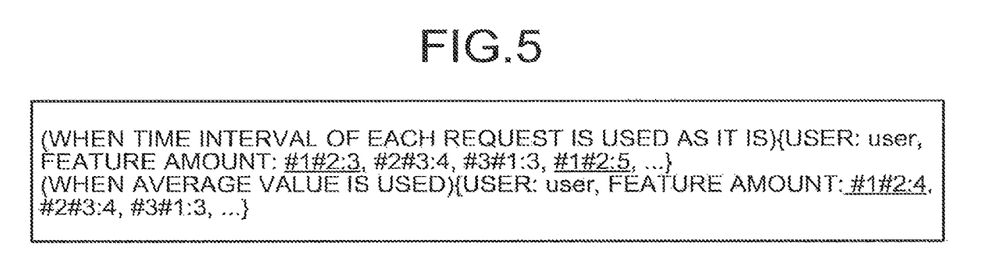
FIG. 5 is a diagram illustrating an example of a feature amount of page browsing by a user extracted by the feature amount extraction unit.

For example, when the time interval of each request indicated in the order of page transitions is used as it is as the page transition time interval, the feature amount extraction unit 113 extracts data {user: user, feature amount: #1#2:3, #2#3:4, #3#1:3, #1#2:5, . . . }, as the feature amount of page browsing by the user, as illustrated in "When time interval of each request is used as it is" in FIG. 5.

Note that when the average value of the time intervals of transitions to the same page is used as the page transition time interval, the feature amount extraction unit 113 extracts data {user: user, feature amount: #1#2:4, #2#3:4, #3#1:3, . . . }, as the feature amount of page browsing by the user, as illustrated in "When average value is used" in FIG. 5. This is because there are two page transitions #1#2 in the above-mentioned "feature amount: #1#2:3, #2#3:4, #3#1:3, #1#2:5, . . . ", an average value (four seconds) of 1#2:3 (three seconds) and #1#2:5 (five seconds) is obtained.

Furthermore, the feature amount extraction unit 113 may extract, as a feature amount, the time of a transition from a transition source page to any page. For example, when the time interval between the request of #1 and the request of #2 is three seconds, the feature amount extraction unit 113 ignores #2 that is a transition destination and extracts a feature amount "#1:3". This represents the feature amount indicating "The user transited from #1 page to any page in three seconds". For example, the feature amount extraction unit 113 can extract data of {user: user, feature amount: #1:3, #2:4, #3:3, #1:5, . . . } as the feature amount of page browsing by the user. Furthermore, also in this case, as the feature amount, the time of a transition from the transition source page to any pages may be used as it is, or when a plurality of transitions to the same page exists in the same session, an average value of time intervals of these transitions to the page may be used.

Furthermore, the feature amount extraction unit 113 may extract the time of a transition from any page to the transition destination page as the feature amount. For example, when the time interval between the request of #1 and the request of #2 is three seconds, the feature amount extraction unit 113 ignores #1 that is a transition source and extracts a feature amount "#2:3". This represents the feature amount indicating "the user transited from any page to the page of #2 in three seconds". For example, the feature amount extraction unit 113 can extract data of {user: user, feature amount: #2:3, #3:4, #1:3, #2:5, . . . } as a feature amount of page browsing by the user Furthermore, also in this case, as the feature amount, the time of a transition from any page to the page transition destination may be used as it is, or when a plurality of transitions to the same page exists in the same session, an average value of time intervals of these transitions to the page may be used.

Note that when data received by the input unit 111 is data for creating the model described above, the feature amount extraction unit 113 outputs the extracted feature amount of the page browsing by the user to the learning unit 12. Furthermore, when the data received by the input unit 111 is data to be estimated for user, the feature amount extraction unit 113 outputs the extracted feature amount of the page browsing of the user to the estimation unit 14.

For the output and timing of the feature amount by the feature amount extraction unit 113, all the feature amounts obtained from the entire session may be output when the session to the website is ended due to logout of the user or the like, or the feature amount may be output one by one each time when page transition occurs and the feature amount of page browsing increases. Furthermore, the timing of outputting the feature amount may be determined by a predetermined timer, the number of extracted feature amounts, the data amount or the like.

When obtaining the output feature amount of page browsing by the user from the feature amount extraction unit 113, the learning unit 12 creates a profile (model) indicating a feature of page browsing by each user according to a machine learning algorithm, and stores the profile in the model storage unit 13. For the machine learning algorithm used by the learning unit 12, implementation of an existing machine learning library such as Jubatus (http://jubat.us/) or scikit-learn (http://scikit-learn.org/) may be used, and a method of the machine learning algorithm is not limited.

For example, the learning unit 12 may use a multi-class classifier for labeling a feature amount belongs to which user among a plurality of users, or may use a multi-label classifier that allows a plurality of labels at the time of labeling. Furthermore, a plurality of binary classifiers may be arranged to form a multi-class classifier or a multi-label classifier. In addition, an anomaly detector may be used instead of a classifier. When an anomaly detector is used, it is interpreted that the user who is not determined as anomalous is labeled.

The model storage unit 13 stores the model created by the learning unit 12.

When obtaining the feature amount of page browsing by the user (that is, the feature amount to be estimated) output from the feature amount extraction unit 113, the estimation unit 14 uses the model stored in the model storage unit 13 according to the machine learning algorithm and estimate the user having the feature amount. The estimation unit 14 outputs a user estimation result to the output unit 15.

The output unit 15 outputs the user estimation result output from the estimation unit 14 to an external device or the like.

According to such a user estimation apparatus 10, even if the number of pages browsed by the user or the number of links included in the page is small, it is possible to accurately estimate who the user is among users who visited in the past.

Next, the processing procedure of the user estimation apparatus 10 will be described. First, with reference to FIG. 6, a procedure for creating a model by the user estimation apparatus 10 will be described.

Figure 6:
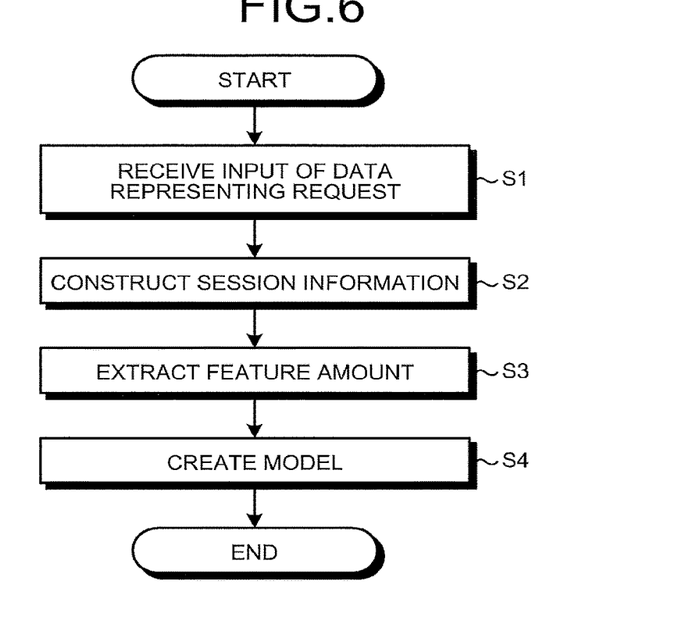
FIG. 6 is a flowchart illustrating a processing procedure when a user estimation apparatus creates a model.

As illustrated in FIG. 6, when the input unit 111 receives an input of data representing a request by a user to the website (S1), the session information construction unit 112 constructs session information (refer to FIG. 3) (S2). Next, the feature amount extraction unit 113 extracts a feature amount of page browsing by the user from the session information (refer to FIG. 3) constructed in S2 (S3). Thereafter, the learning unit 12 creates a profile (model) indicating the feature of page browsing by each user, using the feature amount of page browsing by the user extracted in S3 (S4: model creation). Then, the learning unit 12 stores the created model in the model storage unit 13.

Figure 7:
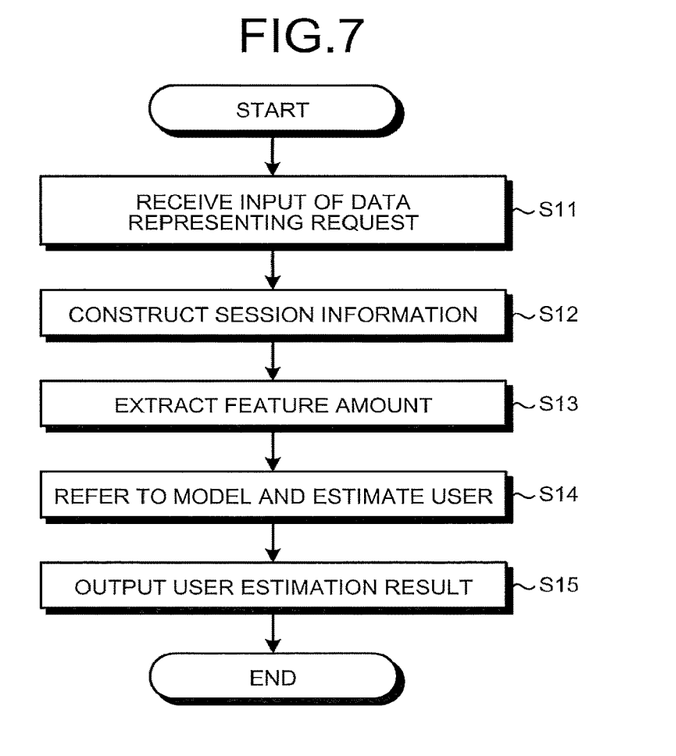
FIG. 7 is a flowchart illustrating a processing procedure when the user estimation apparatus estimates a user.

Next, with reference to FIG. 7, the procedure for estimating the user by the user estimation apparatus 10 will be described.

First, when the input unit 111 receives an input of data to be estimated (data representing a request by a user to the website) (S11), the session information construction unit 112 constructs session information (refer to FIG. 3) (S12), The feature amount extraction unit 113 extracts a feature amount of page browsing by the user from the session information (refer to FIG. 3) constructed in S12 (S13). Thereafter, the estimation unit 14 refers to the feature amount of page browsing by the user extracted in S13 and the model stored in the model storage unit 13 (S14), and estimates the user. Then, the estimation unit 14 outputs a user estimation result via the output unit 15 (S15).

According to such a user estimation apparatus 10, even if the number of pages browsed by the user or the number of links included in the page is small, it is possible to accurately estimate who the user is among users who visited in the past. Note that although the user estimation apparatus 10 extracts the order of page transitions on the website by the user and the time interval of a transition to each page as the feature amounts of page browsing by the user, the user estimation apparatus 10 may extract either the order of page transitions on the website by the user or the time interval of a transition to each page.

Second Embodiment

Next, a user estimation apparatus 10 according to a second embodiment will be described. The same reference numerals are given to the same configurations as those in the above-described embodiment, and a description thereof will be omitted. In the user estimation apparatus 10 according to the second embodiment, when a model is created or when a user is estimated, a feature amount extraction unit 113 extracts at least one or more of a session start page, the number of unique pages included in a session, and a session length as a feature amount of page browsing by the user.

Note that the session start page refers to a URL path of a request destination included at the beginning of the session information. For example, in the case of the session information of item number 1 illustrated in FIG. 3, the feature amount extraction unit 113 extracts "start page: /index.html" of request 1 or a value after a conversion by a conversion table (refer to FIG. 4) (start page: #1) as a feature amount.

The number of unique pages included in the session refers to the number of unique request URL paths included in the session information. For example, when a sequence of the request replaced by a character string of numbers is "#1#2#1#3#2" by the conversion table (refer to FIG. 4), since the number of included unique requests are three, that is, #1, #2, and #3, "number of unique pages: 3" is extracted as a feature amount.

Furthermore, the session length refers to the number of requests included in the session information (refer to FIG. 3). For example, when a sequence of the request replaced by a character string of numbers by the conversion table (refer to FIG. 4) is "#1#2#3#4", since four requests are included, the feature amount extraction unit 113 extracts "session length: 4" as a feature amount.

As described above, the user estimation apparatus 10 extracts the session start page, the number of unique pages included in the session, the session length, and the like as the feature amounts of page browsing by the user, creates a model, and estimates the user, thereby being capable of more accurately estimating the user.

Third Embodiment

Next, a user estimation apparatus 10 according to a third embodiment will be described. The same reference numerals are given to the same configurations as those in the above-described embodiment, and a description thereof will be omitted. In the user estimation apparatus 10 according to the third embodiment, an input unit 111 selects significant input data from input data and passes the selected input data to a session information construction unit 112.

In general, the access log of a server includes not only a request of a page but also a request for obtaining an image and JavaScript (registered trademark) included in the page. These requests are requests done automatically by the browser, not directly reflecting the behavior of a user. In view of this, the input unit 111 of the user estimation apparatus 10 according to the third embodiment removes a request corresponding to a prespecified pattern from data representing an input request to the website, and passes data representing a request to the website after the request is removed, to the session information construction unit 112.

As a pattern designation method, for example, designation by a regular expression can be exemplified, but other methods may be used.

For example, to specify a request of obtaining an image (JPEG, PNG, GIF), JavaScript (registered trademark), and CSS, as an object to be excluded, by a regular expression, the regular expression is the following.

\.jpg$|\.png$|\.gif$|\.js$|\.css$

This means that the end of the character string of the URL included in the request represents any of ".jpg", ".png", ".gif", ".js", and ".css".

Furthermore, instead of specifying by a pattern, the input unit 111 may remove a request whose time interval from an immediately preceding request is a predetermined threshold or less in the same session, and may pass a request excluding the removed request to the session information construction unit 112.

As described above, the input unit 111 passes, to the session information construction unit 112, a request excluding a request of obtaining an image (JPEG, PNG, and GIF), JavaScript (registered trademark), CSS or a request whose time interval from an immediately preceding request in the same session is the predetermined threshold value or less. As a result, a feature amount extraction unit 113 extracts the feature amount of page browsing by the user on the basis of the request of obtaining an image, JavaScript (registered trademark), CSS included in the request destination page, or the request excluding the request whose time interval from an immediately preceding request in the same session is the predetermined threshold or less.

By doing in this way, the user estimation apparatus 10 can extract the feature amounts of page browsing by the user on the basis of a request excluding a request that is highly likely to be automatically made by the browser, that is, a request highly likely to represent the direct behavior of the user, and estimates the user. Therefore, it is possible to further improve the accuracy of estimating the user.

Fourth Embodiment

Next, a user estimation apparatus 10 according to a fourth embodiment will be described. The same reference numerals are given to the same configurations as those in the above-described embodiment, and a description thereof will be omitted. In the user estimation apparatus 10 according to the fourth embodiment, an input unit 111 abstracts a URL path of a request destination of input data in an input unit 111 and passes the abstracted URL path to a session information construction unit 112.

There are two methods of this abstraction, for example, the following (1) cutoff by hierarchy level and (2) replacement by regular expression, either of the methods can be used, or a combination of both the methods may be used.

(1) Cutoff by Hierarchy Level

Figure 8:
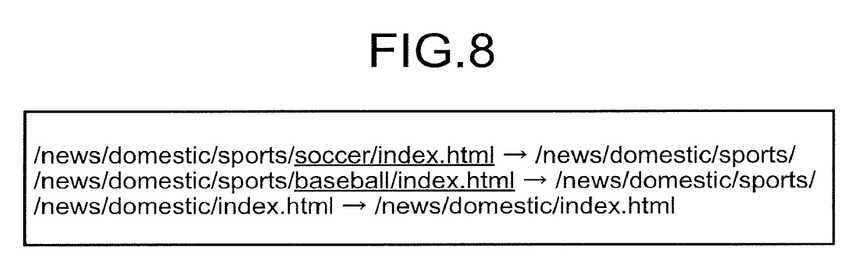
FIG. 8 is a diagram for describing cutoff by hierarchy level in an input unit.

The input unit 111 cuts off a hierarchy delimited by "/" in the URL path of the request destination in the input data at a predetermined hierarchy level. For example, as illustrated in FIG. 8, the input unit 111 deletes a portion after the third hierarchy level of the URL path (underlined portion in FIG. 8). Then, the input unit 111 passes, to the session information construction unit 112, a request after the hierarchy delimited by "/" in the URL path of the request destination is cut off at the predetermined hierarchy level. As a result, a feature amount extraction unit 113 extracts a feature amount of page browsing by the user on the basis of the URL path of the request destination up to the predetermined hierarchy level in the hierarchy delimited by "/" in the path.

By doing so, the user estimation apparatus 10 can estimate the user on the basis of the feature amount of page browsing by the user that focuses on content in the hierarchy level (directory) desired by a user of the user estimation apparatus 10, among content on the website.

For example, the following description considers a case where the website is a news site and the URL path of this website is configured as "/category/date/article". In this case, the user estimation apparatus 10 cuts off the hierarchy at "/category/" that is the first hierarchy level in the URL of the request destination, thereby estimating the user on the basis of the feature amount of page browsing by the user that focuses on the category.

(2) Replacement by Regular Expression

Figure 9:
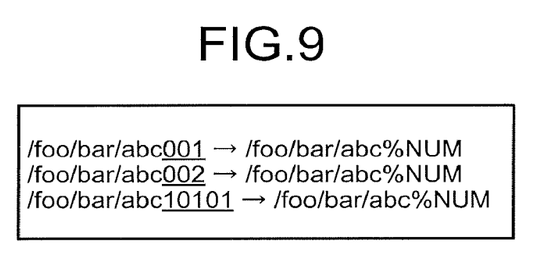
FIG. 9 is a diagram for describing replacement by a regular expression in the input unit.

The input unit 111 replaces the URL of the request destination in the input data with a prespecified regular expression. For example, when the input unit 111 includes a three or more digit number in the URL of the request destination, the input unit 111 replaces the number with "% NUM". In this case, the input unit 111 specifies as "Before replacement: "[0-9]{3,}" After replacement: "% NUM", and replaces a portion corresponding to the three or more digit number in the URL of the request destination (underlined portion in FIG. 9) with "% NUM", as illustrated in FIG. 9. Then, the input unit 111 passes the request replaced as described above to the session information construction unit 112. As a result, when a unique ID is assigned to the URL of the request destination for each session, the feature amount extraction unit 113 extracts the feature amount of page browsing by the user on the basis of the URL, the ID portion of which has been replaced with the regular expression such as "% NUM".

By doing so, even if the request is a request to the website such that the unique ID is assigned to the URL for each session, the user estimation apparatus 10 can treat URLs of the request destinations that are different each other only in their IDs among URLs of access destinations, as the same URL, and extracts the feature amount of page browsing by the user. As a result, the user estimation apparatus 10 can further improve the accuracy of estimating the user.

Program

Furthermore, it is also possible to create and execute a program in which the processing executed by the user estimation apparatus 10 according to the above embodiments is described in a language that can be executed by a computer. In this case, by executing the program by the computer, it is possible to obtain effects similar effects to those in the above embodiments. In addition, processing similar to that in the above embodiments may be achieved by recording such a program on a computer-readable recording medium, and by causing the computer to read and execute the program recorded on the recording medium. An example of a computer that executes a user estimation program that achieves functions similar to those of the system will be described below.

Figure 10:
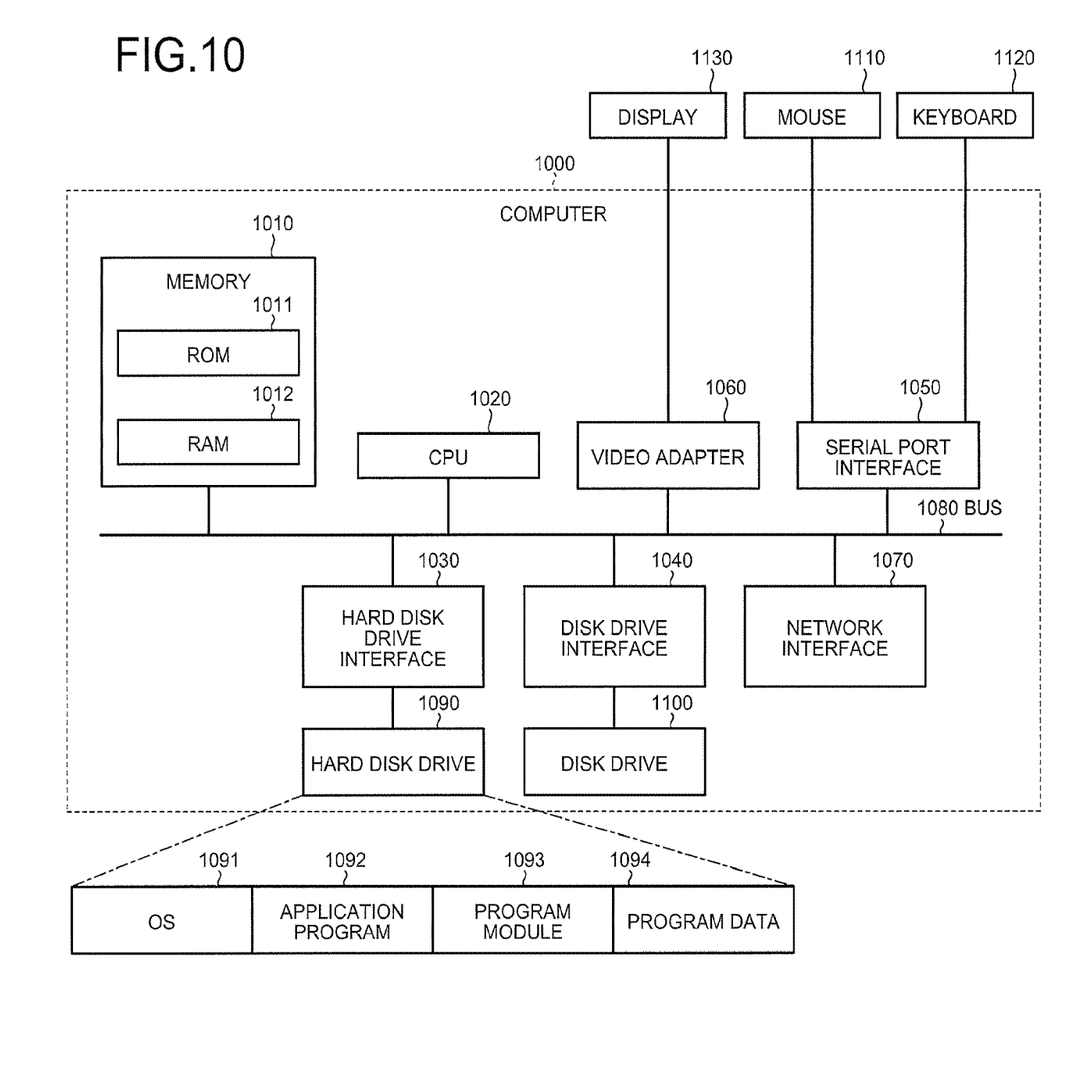
FIG. 10 is a diagram illustrating a computer that executes a user estimation program.

FIG. 10 is a diagram illustrating the computer that executes the user estimation program. As illustrated in FIG. 10, a computer 1000 includes, for example, a memory 1010, a central processing unit (CPU) 1020, a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. A removable storage medium such as a magnetic disk or an optical disk is inserted in the disk drive 1100. For example, a mouse 1110 and a keyboard 1120 are connected to the serial port interface 1050. For example, a display 1130 is connected to the video adapter 1060.

Herein, as illustrated in FIG. 10, the hard disk drive 1090 stores, for example, OS 1091, an application program 1092, a program module 1093, and program data 1094. The information and the like described in the above embodiments are stored for example, in the hard disk drive 1090 or the memory 1010.

Furthermore, the user estimation program is stored in the hard disk drive 1090, for example, as a program module in which a command to be executed by the computer 1000 is described. More specifically, a program module describing each processing executed by the system described in the above-described embodiments is stored in the hard disk drive 1090.

Furthermore, data used for information processing by the user estimation program is stored, for example, in the hard disk drive 1090 as program data. Then, the CPU 1020 reads the program module 1093 and the program data 1094 stored in the hard disk drive 1090 to a RAM 1012 as necessary, and executes each of the above-described procedures.

Note that the program module 1093 and the program data 1094 relating to the user estimation program are not limited to being stored in the hard disk drive 1090, but may be stored in a detachable storage medium and read by the CPU 1020 via the disk drive 1100 or the like. Alternatively, the program module 1093 and the program data 1094 relating to the user estimation program may be stored in another computer connected via a network such as a local area network (LAN) and a wide area network (WAN), and read by the CPU 1020 via the network interface 1070.

REFERENCE SIGNS LIST

10 USER ESTIMATION APPARATUS
11 EXTRACTION UNIT
12 LEARNING UNIT
13 MODEL STORAGE UNIT
14 ESTIMATION UNIT

15 OUTPUT UNIT
111 INPUT UNIT
112 SESSION INFORMATION CONSTRUCTION UNIT
113 FEATURE AMOUNT EXTRACTION UNIT

The invention claimed is:

1. A user estimation apparatus, comprising: processing circuitry configured to:
   implement two states of a learning mode and an estimation mode, where
   in the learning mode, the processing circuitry is configured to extract at least an order of page transitions on a website by each user of a plurality of users and a time interval of a transition to each page, as feature amounts of page browsing by the user during the learning mode, from data which is to be learned and represents a page-browsing session by the user to the website, and
   in the estimation mode, the processing circuitry is configured to extract at least an order of page transitions on the website and a time interval of a transition to each page, as a feature amount of page browsing by any user of the plurality of users, from data which is to be estimated and represents a page-browsing session by the any user to the website;
   create a model indicating a feature of page browsing for each user, by learning the feature amount, which is to be learned and is extracted by the processing circuitry in the learning mode, of page browsing by each user; and
   refer to the feature amount, which is to be estimated and is extracted by the processing circuitry in the estimation mode, of page browsing by the any user, and the model, and estimates who the any user is among the plurality of users who have visited the website in the past,
   wherein the processing circuitry extracts the feature amount of page browsing by the user in the learning mode and the estimation mode on a basis of using a uniform resource locator (URL) up to a predetermined hierarchy level that a user previously set in the URL of a request destination in the data representing the request, and cutting off the remainder of the URL after the predetermined hierarchy level, hierarchy levels of the URL each being separated by "/", and the processing circuitry excludes, from the data that represents the page-browsing session in the learning mode and the estimation mode, requests made from a user's browser which correspond to a predetermined pattern of a request that is performed automatically by the user's browser.

2. The user estimation apparatus according to claim 1, wherein the processing circuitry further extracts all of a start page of browsing on the website, the number of unique pages of the browsing, and a session length required for the browsing of the website, as the feature amount of the page browsing by the user.

3. The user estimation apparatus according to claim 1, wherein the data corresponding to the predetermined pattern of a request that is performed automatically by the user's browser is data representing a request of obtaining an image, JavaScript (registered trademark), or cascading style sheets (CSS) is included in the data representing the request to the website.

4. The user estimation apparatus according to claim 1, wherein when the URL of the request destination in the data representing the request includes a unique ID for each session, the processing circuitry extracts the feature amount of page browsing by the user on the basis of the URL other than an ID portion.

5. A user estimation method, comprising:
   implementing two states of a learning mode and an estimation mode, where
   in the learning mode, the method includes extracting at least an order of page transitions on a website by each user of a plurality of users and a time interval of a transition to each page, as feature amounts of page browsing by the user during the learning mode, from data which is to be learned and represents a page-browsing session by the user to the website, and
   in the estimation mode, the method includes extracting at least an order of page transitions on the website and a time interval of a transition to each page, as a feature amount of page browsing by any user of the plurality of users, from data which is to be estimated and represents a page-browsing session by the any user to the website;
   creating a model indicating a feature of page browsing for each user, by learning the feature amount, which is to be learned and is extracted in the learning mode, of page browsing by each user; and
   referring to the feature amount, which is to be estimated and is extracted in the estimation mode, of page browsing by the any user, and the model, and estimating who the any user is among the plurality of users who have visited the website in the past,
   wherein the method includes extracting the feature amount of page browsing by the user in the learning mode and the estimation mode on a basis of using a uniform resource locator (URL) up to a predetermined hierarchy level that a user previously set in the URL of a request destination in the data representing the request, and cutting off the remainder of the URL after the predetermined hierarchy level, hierarchy levels of the URL each being separated by "/", and the method includes excluding, from the data that represents the page-browsing session in the learning mode and the estimation mode, requests made from a user's browser which correspond to a predetermined pattern of a request that is performed automatically by the user's browser.

6. A non-transitory computer readable storage medium having stored therein a user estimation program causing a computer to execute a process comprising:
   implementing two states of a learning mode and an estimation mode, where
   in the learning mode, the method includes extracting at least an order of page transitions on a website by each user of a plurality of users and a time interval of a transition to each page, as feature amounts of page browsing by the user during the learning mode, from data which is to be learned and represents a page-browsing session by the user to the website; and
   in the estimation mode, the method includes extracting at least an order of page transitions on the website and a time interval of a transition to each page, as a feature amount of page browsing by any user of the plurality of users, from data which is to be estimated and represents a page-browsing session by the any user to the website;
   creating a model indicating a feature of page browsing for each user, by learning the feature amount, which is to be learned and is extracted in the learning mode, of page browsing by each user; and referring to the feature amount, which is to be estimated and is extracted in the estimation mode, of page browsing by the any user, and the model, and estimating who the any user is among the plurality of users who have visited the website in the past,
wherein the method includes extracting the feature amount of page browsing by the user in the learning mode and the estimation mode on a basis of using a uniform resource locator (URL) up to a predetermined hierarchy level that a user previously set in the URL of a request destination in the data representing the request, and cutting off the remainder of the URL after the predetermined hierarchy level, hierarchy levels of the URL each being separated by "/", and the method includes excluding, from the data that represents the page-browsing session in the learning mode and the estimation mode, requests made from a user's browser which correspond to a predetermined pattern of a request that is performed automatically by the user's browser.

* * * * *